United States Patent
Shapira et al.

(10) Patent No.: US 10,649,777 B2
(45) Date of Patent: May 12, 2020

(54) HARDWARE-BASED DATA PREFETCHING BASED ON LOOP-UNROLLED INSTRUCTIONS

(71) Applicant: International Business Machines Corporation, Armonk, NY (US)

(72) Inventors: Yossi Shapira, Shoham (IL); Eyal Naor, Tel Aviv (IL); Gregory Miaskovsky, Ariel (IL); Yair Fried, Petah Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 15/978,245

(22) Filed: May 14, 2018

(65) Prior Publication Data
US 2019/0347103 A1    Nov. 14, 2019

(51) Int. Cl.
*G06F 9/38*    (2018.01)
*G06F 12/0862*    (2016.01)
*G06F 9/30*    (2018.01)

(52) U.S. Cl.
CPC .......... *G06F 9/381* (2013.01); *G06F 9/30065* (2013.01); *G06F 9/30145* (2013.01); *G06F 12/0862* (2013.01)

(58) Field of Classification Search
None
See application file for complete search history.

(56) References Cited

U.S. PATENT DOCUMENTS

| 7,475,231 | B2 * | 1/2009 | Tran ...................... G06F 9/325 712/241 |
| 7,669,194 | B2 | 2/2010 | Archambault |
| 8,490,065 | B2 * | 7/2013 | Archambault ........ G06F 8/4442 717/130 |
| 9,519,586 | B2 * | 12/2016 | Gilbert ................ G06F 12/0862 |
| 2012/0254591 | A1 * | 10/2012 | Hughes ............... G06F 9/30018 712/205 |
| 2014/0189249 | A1 * | 7/2014 | Ye ...................... G06F 12/0862 711/137 |

(Continued)

OTHER PUBLICATIONS

Guo et al., "Energy-Efficient Hardware Data Prefetching". IEEE Transactions on Very Large Scale Integration (VLSI) Systems, vol. 19, No. 2, Feb. 2011. URL: http://sei.pku.edu.cn/~yaoguo/papers/Guo-TVLSI-11.pdf.

*Primary Examiner* — Eric Coleman
(74) *Attorney, Agent, or Firm* — Cantor Colburn LLP; William Kinnaman

(57) ABSTRACT

Prefetching data by determining that a first set of instructions that is processed by a computer processor indicates that a second set of instructions includes multiple iteration groups, where each of the iteration groups includes one or more loop-unrolled instructions, monitoring the second set of instructions as the second set of instructions is processed by the computer processor after the first set of instructions is processed by the computer processor, mapping a corresponding one of the loop-unrolled instructions in each of the iteration groups of the second set of instructions to a stride-tracking record that is shared by the corresponding loop-unrolled instructions, and prefetching data into a cache memory of the computer processor based on the stride-tracking record.

14 Claims, 2 Drawing Sheets

(56) References Cited

U.S. PATENT DOCUMENTS

| | | | | |
|---|---|---|---|---|
| 2014/0237212 A1* | 8/2014 | Garg | .................. | G06F 12/0215 |
| | | | | 711/205 |
| 2015/0026434 A1* | 1/2015 | Basant | .................... | G06F 9/546 |
| | | | | 712/205 |
| 2016/0139898 A1* | 5/2016 | Pudiyapura | ............... | G06F 8/33 |
| | | | | 717/158 |
| 2017/0010970 A1* | 1/2017 | Chou | .................. | G06F 12/0862 |

* cited by examiner

HARDWARE-BASED DATA PREFETCHING BASED ON LOOP-UNROLLED INSTRUCTIONS

BACKGROUND

Data prefetching is a technique often employed by computer processors to improve execution performance by retrieving data from slow-access storage, typically main memory, to fast-access local storage, typically cache memory, before the data are actually needed for processing. Data prefetching strategies typically leverage situations in which sequential data items are stored contiguously in statically-allocated memory, such as is typically the case with array-based data that are to be retrieved and processed in the order in which they are stored. For example, when the following programming loop is used to access a data array:

```
for (int i=0; i<1024; i++) {
    array1[i] = array1[i] + 1;
}
``` the i-th element of the array "array1" is accessed at each iteration. Thus, array elements that are going to be accessed in future iterations may be prefetched before the future iterations occur.

In hardware-based prefetching, a computer processor includes a mechanism that monitors the stream of instructions of a program during its execution, recognizes elements that the program might access in the future based on this stream, and prefetches such elements into the processor's cache. In the above programming loop example, a type of hardware-based prefetching known as "strided prefetching" may be used to identify instructions for which data are accessed at a computer memory address, determine that the same instruction at the same instruction address is executed multiple times, where each time data are accessed at a different computer memory address, and determine the number of intermediate addresses from one such computer memory address to the next, known as a "stride." Once a consistent stride pattern is established for such an instruction at a given instruction address, data may be prefetched from computer memory addresses that are multiple strides ahead of the computer memory address most recently accessed by the instruction. In order to monitor such instructions, hardware-based strided prefetching mechanisms typically maintain a stride-tracking record in a history table of such records for each such instruction, the stride-tracking record indicating the address of the instruction and tracking the stride between the computer memory addresses accessed each time the same instruction is executed. A consistent stride typically takes three iterations of a prefetching candidate instruction, where its stride is determined during the second iteration and is verified during the third iteration. Thus, in the above example, if a consistent stride is verified when array1[2] is fetched from computer memory, prefetching can be begun starting with the computer memory location at the next stride.

Unfortunately, hardware-based strided prefetching is complicated by optimizing compilers that attempt to improve a program's execution performance by employing "loop unrolling" techniques, whereby loop instructions that would otherwise be performed in repeated iterations are transformed into a repeated sequence of instructions that require fewer iterations. Thus, in the above programming loop example, the loop may be transformed into separate instructions in a loop-unrolled format equivalent to the following instructions:

```
for (int i=0; i<1024; i+5) {
    array1[i] = array1[i] + 1;
    array1[i+1] = array1[i+1] + 1;
    array1[i+2] = array1[i+2] + 1;
    array1[i+3] = array1[i+3] + 1;
    array1[i+4] = array1[i+4] + 1;
}
```

If hardware-based strided prefetching is then applied in the manner described above, since each of the array access instructions above will be transformed into five corresponding instructions requiring memory access, each having a different instruction address, five separate stride-tracking records will be required to track the strides between the computer memory addresses accessed by their corresponding instructions. Where a computer processor is configured with a limited number of stride-tracking records, this can result in thrashing of the history table, aliasing when mapping instruction addresses to stride-tracking records, or contention, any of which may result in reducing the effectiveness of the hardware-based prefetching mechanism. Also, given that in the loop-unrolled example above a consistent stride can only be verified for instruction array1[i]=array1[i]+1 during its third iteration, when fetching array1[10], prefetching might not even occur when short loops are loop-unrolled.

SUMMARY

In one aspect of the invention a method is provided for prefetching data, the method including determining that a first set of instructions that is processed by a computer processor indicates that a second set of instructions includes multiple iteration groups, where each of the iteration groups includes one or more loop-unrolled instructions, monitoring the second set of instructions as the second set of instructions is processed by the computer processor after the first set of instructions is processed by the computer processor, mapping a corresponding one of the loop-unrolled instructions in each of the iteration groups of the second set of instructions to a stride-tracking record that is shared by the corresponding loop-unrolled instructions, and prefetching data into a cache memory of the computer processor based on the stride-tracking record.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
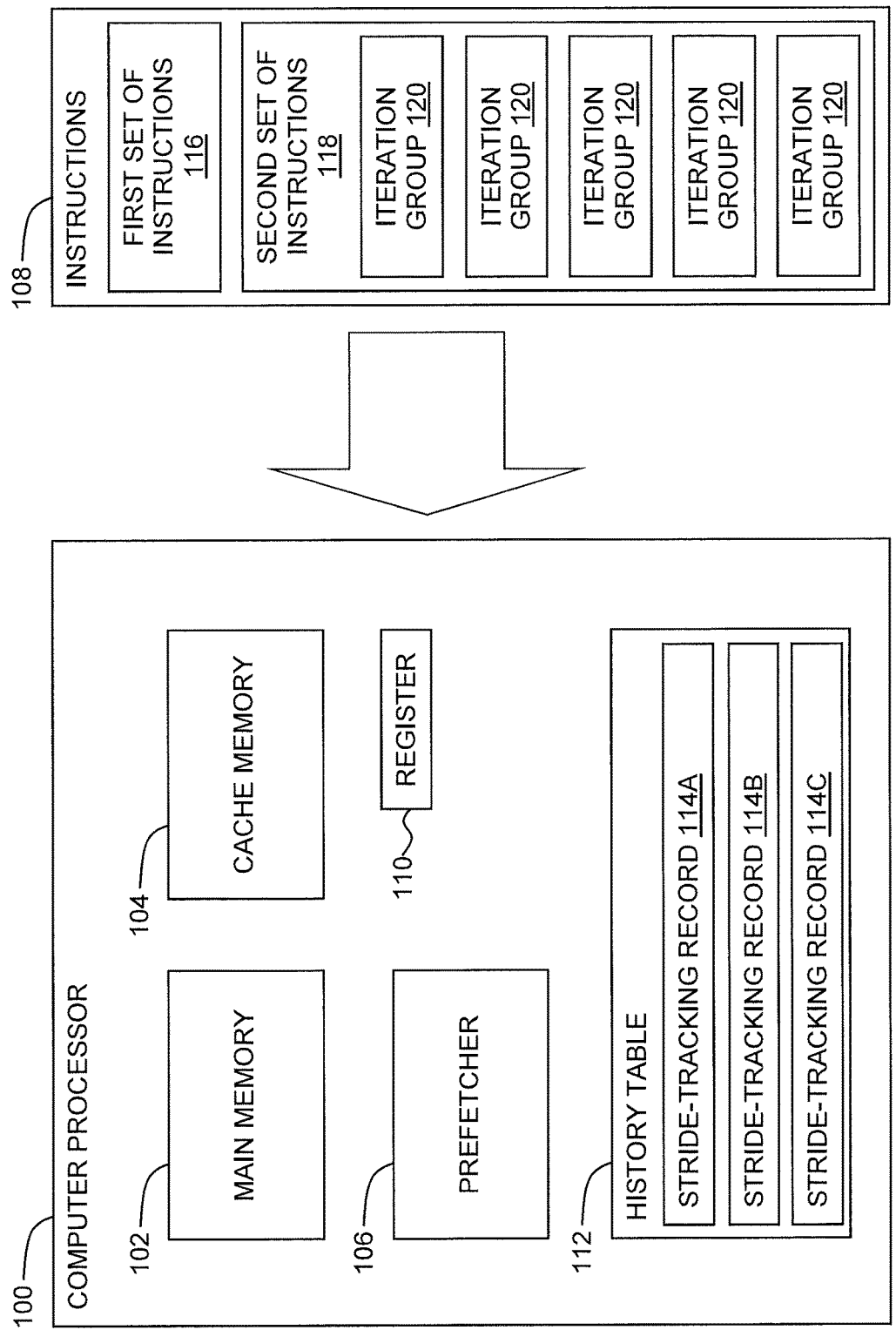
FIG. 1 is a simplified conceptual illustration of a system for prefetching data, constructed and operative in accordance with an embodiment of the invention.

Reference is now made to FIG. 1, which is a simplified conceptual illustration of a system for prefetching data, constructed and operative in accordance with an embodiment of the invention. In the system of FIG. 1, a computer processor 100 is shown including a main memory 102, a cache memory 104, and a prefetcher 106 preferably assembled therewith. Prefetcher 106 is configured to monitor instructions as they are processed by computer processor 100, such as a set of instructions 108, to identify instructions that are prefetching candidates, such as memory-to-register "load" instructions for which data are accessed at a computer memory address and loaded into a register of computer processor 100, such as a register 110, as well as "store" instructions that require cache lines to be copied from computer memory into cache memory prior to modifying and storing the cache line back to computer memory. Prefetcher 106 maintains a history table 112 that includes a number of stride-tracking records, such as stride-tracking records 114A, 114B, and 114C, for tracking such prefetching candidate instructions in accordance with conventional hardware-based strided prefetching techniques, except as is otherwise described herein.

In accordance with an embodiment of the invention, prefetcher 106 is configured to determine that the first set of instructions 116 that is processed by the computer processor 100 indicates that a second set of instructions 118 includes two or more iteration groups 120, where each of the iteration groups 120 includes one or more loop-unrolled instructions. Preferably, the second set of instructions 118 immediately follows the first set of instructions 116, such as where both the first set of instructions 116 and the second set of instructions 118 are included in a parent set of instructions, such as the set of instructions 108. The loop-unrolled instructions are typically associated with a loop of instructions, where each of the iteration groups 120 corresponds to a different iteration of the loop of instructions.

The first set of instructions 116 preferably includes one or more instructions that, taken together, provides the following information regarding the second set of instructions 118:
a) a count of the iteration groups 120 in the second set of instructions 118;
b) a count of the loop-unrolled instructions in any of the iteration groups 120, where the count of the loop-unrolled instructions is the same for each of the iterations groups 120; and
c) a count of instruction bytes in any of the iteration groups 120, where the count of instruction bytes is the same for each of the iterations groups 120.

The first set of instructions 116 is preferably configured by an optimizing compiler to include the above information regarding the second set of instructions 118 based on loop unrolling that the optimizing compiler applies to a loop of instructions that are compiled by the optimizing compiler, where the resulting loop-unrolled instructions are included in the second set of instructions 118.

Prefetcher 106 is configured to monitor the second set of instructions 118 as the second set of instructions 118 is processed by the computer processor 100 after the first set of instructions 116 is processed by the computer processor 100. Using the information provided by the first set of instructions 116 regarding the second set of instructions 118, prefetcher 106 maps a corresponding one of the loop-unrolled instructions in each of the iteration groups 120 of the second set of instructions 118 to a corresponding one of stride-tracking records 114A, 114B, and 114C that is shared by each of the corresponding loop-unrolled instructions, provided that prefetcher 106 has identified the loop-unrolled instruction being mapped as a prefetching candidate instruction. Thus, for example, where the first set of instructions 116 indicates that the second set of instructions 118 includes three iteration groups 120, and each iteration group 120 includes three prefetching candidate instructions, prefetcher 106 maps the first prefetching candidate instruction in each of the three iteration groups 120 to stride-tracking record 114A, maps the second prefetching candidate instruction in each of the three iteration groups 120 to stride-tracking record 114B, and maps the third prefetching candidate instruction in each of the three iteration groups 120 to stride-tracking record 114C. Prefetcher 106 preferably maps each prefetching candidate instruction in each of the iteration groups 120 in the second set of instructions 118 to a stride-tracking record by applying a predefined mapping function to a combination of a) the instruction address of the corresponding loop-unrolled instruction being mapped, where each of the corresponding loop-unrolled instructions has a different instruction address;

b) the index number of the iteration group 120 of the corresponding loop-unrolled instruction being mapped, where the iteration groups 120 form a sequence within the second set of instructions 118, and where the index number indicates the position of the iteration group 120 (of the corresponding loop-unrolled instruction being mapped) within the sequence of iteration groups 120; and c) the count of the instruction bytes within the iteration group 120 of the corresponding loop-unrolled instruction being mapped.

Prefetcher 106 then prefetches data in accordance with conventional strided prefetching techniques based on any of the stride-tracking records that meets one or more predefined eligibility criteria for prefetching. For example, when a given stride-tracking record indicates that a consistent stride is encountered a predefined number of consecutive times for corresponding prefetching candidate instructions (in multiple iteration groups 120) that are mapped to the given stride-tracking record, prefetcher 106 prefetches data into cache memory 104 from computer memory addresses of main memory 102 that are a predefined number of strides ahead of the computer memory address most recently accessed by one of the corresponding prefetching candidate instructions.

Operation of the system of FIG. 1 may be illustrated in the context of the following example in which the following loop of instructions:

```
for (int i=0; i<1024; i++) {
    instruction1; // Eq. to Load R1←A[i]
    instruction2; // Eq. to Load R2←B[i]
    instruction3; // Eq. to Load R3←C[i]
    . . .
}
``` is loop-unrolled by an optimizing compiler into the equivalent of the following loop of instructions:

```
for (int i=0; i<1024; i+4) {
    instruction1;    // Eq. to Load R1←A[i]
    instruction2;    // Eq. to Load R2←B[i]
    instruction3;    // Eq. to Load R3←C[i]
    . . .            // 8 instructions that are not prefetching candidates
    instruction1;    // Eq. to Load R1←A[i+1]
    instruction2;    // Eq. to Load R2←B[i+1]
    instruction3;    // Eq. to Load R3←C[i+1]
    . . .            // 8 instructions that are not prefetching candidates
    instruction1;    // Eq. to Load R1←A[i+2]
    instruction2;    // Eq. to Load R2←B[i+2]
```

-continued

```
instruction3;    // Eq. to Load R3←C[i+2]
...              // 8 instructions that are not prefetching candidates
instruction1;    // Eq. to Load R1←A[i+3]
instruction2;    // Eq. to Load R2←B[i+3]
instruction3;    // Eq. to Load R3←C[i+3]
...              // 8 instructions that are not prefetching candidates
}
``` where A, B, and C denote different data arrays, and where R1, R2, and R3 denote different registers of computer processor 100.

The optimizing compiler configures the first set of instructions 116 to include the following single instruction:

| Instruction Address | Instruction |
|---|---|
| X−4 | Loop-Unrolled, 4, 11, 44 | indicating that the second set of instructions 118 immediately following the first set of instructions 116 includes the following:
a) 4 iteration groups 120;
b) 11 loop-unrolled instructions in each iteration group 120; and
c) 44 instruction bytes in each iteration group 120.

The optimizing compiler configures the second set of instructions 118 to include the following loop-unrolled instructions:

| Instruction Address | Instruction: |
|---|---|
| X | Load R1←A[i] |
| X+4 | Load R2←B[i] |
| X+8 | Load R3←C[i] |
| ... | // 8 instructions that are not prefetching candidates |
| X+44 | Load R1←A[i+1] |
| X+48 | Load R2←B[i+1] |
| X+52 | Load R3←C[i+1] |
| ... | // 8 instructions that are not prefetching candidates |
| X+88 | Load R1←A[i+2] |
| X+92 | Load R2←B[i+2] |
| X+96 | Load R3←C[i+2] |
| ... | // 8 instructions that are not prefetching candidates |
| X+132 | Load R1←A[i+3] |
| X+136 | Load R2←B[i+3] |
| X+140 | Load R3←C[i+3] |
| ... | // 8 instructions that are not prefetching candidates |
| X+176 | i=i+4 |
| X+178 | Branch |

The four iteration groups 120 thus form a sequence within the second set of instructions 118 as follows:

| Sequence Index No. | Instruction Addresses |
|---|---|
| 0 | X through X+40 |
| 1 | X+44 through X+84 |
| 2 | X+88 through X+128 |
| 3 | X+132 through X+172 |

In this example, history table 112 includes 16 stride-tracking records. Prefetcher 106 maps each prefetching candidate instruction in each of the iteration groups 120 in the second set of instructions 118 to a stride-tracking record by applying the following predefined mapping function to the instruction address (IA) of the instruction being mapped, the sequence index number (IndexNo) of the iteration group 120 to which the instruction being mapped belongs, and the count of the instruction bytes (ByteCount) within each iteration group 120 as follows:

Stride-tracking record no.=Value of 4 lowest bits of (IA−(IndexNo*ByteCount))

Thus, assuming that the value of 4 lowest bits of instruction address X is 0000, the prefetching candidate instructions in the second set of instructions 118 will be mapped to stride-tracking records as follows:

| Instruction Address | Stride-tracking record no.: |
|---|---|
| X | 0000 |
| X+4 | 0100 |
| X+8 | 1000 |
| X+44 | 0000 |
| X+48 | 0100 |
| X+52 | 1000 |
| X+88 | 0000 |
| X+92 | 0100 |
| X+96 | 1000 |
| X+132 | 0000 |
| X+136 | 0100 |
| X+140 | 1000 |

Thus, the first prefetching candidate instruction in each of the iteration groups 120 is mapped to the same stride-tracking record no. 0000, the second prefetching candidate instruction in each of the iteration groups 120 is mapped to the same stride-tracking record no. 0100, and the third prefetching candidate instruction in each of the iteration groups 120 is mapped to the same stride-tracking record no. 1000. Prefetcher 106 records in each given stride-tracking record the stride between the addresses of the accessed data locations for each of the corresponding prefetching candidate instructions in each of the iteration groups 120 that are mapped to the same given stride-tracking record. Prefetcher 106 then prefetches data in accordance with conventional strided prefetching techniques based on any of the stride-tracking records that meets predefined eligibility criteria for prefetching.

Figure 2:
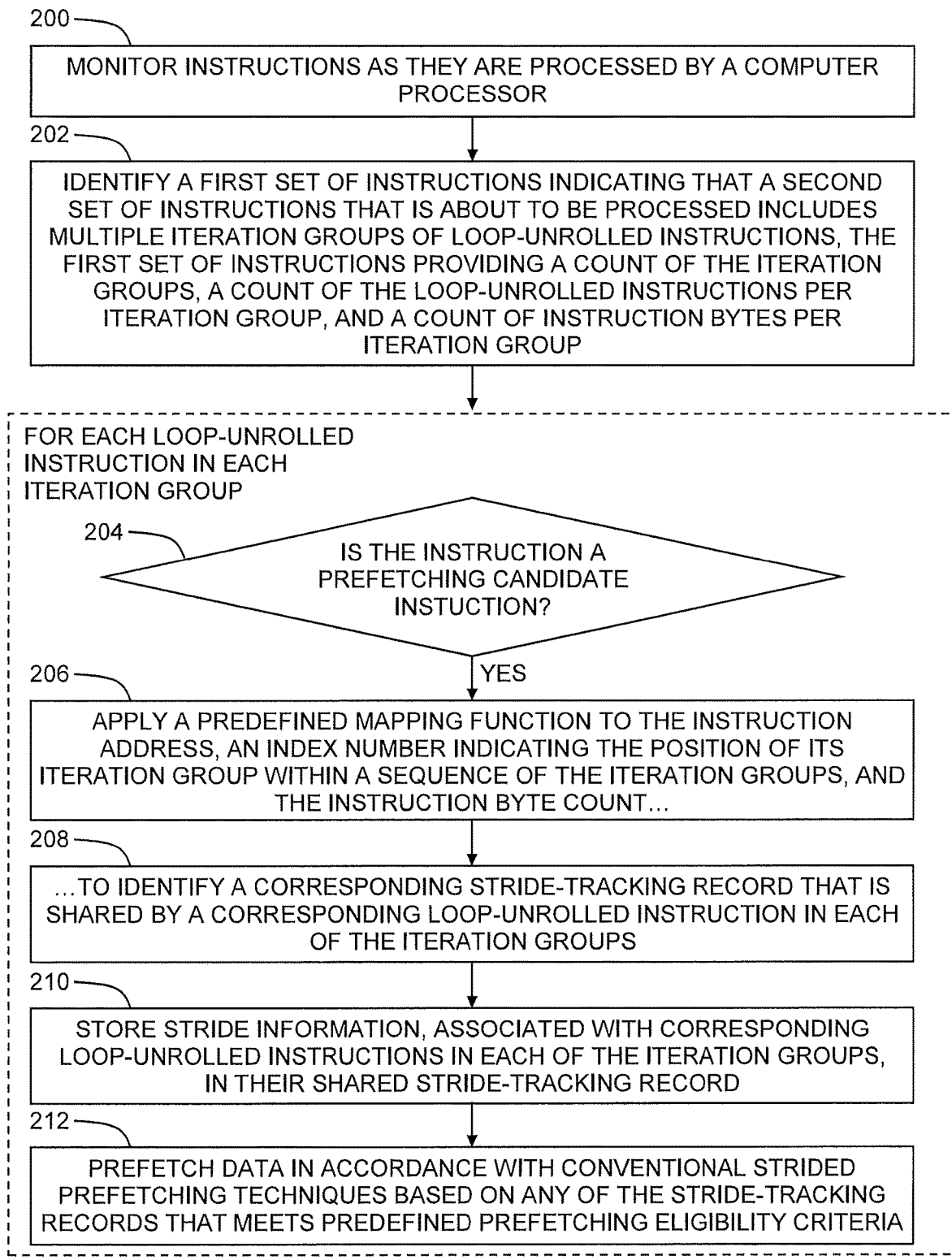
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, instructions are monitored as they are processed by a computer processor (step 200). A first set of instructions is identified that indicates that a second set of instructions that is about to be processed includes multiple iteration groups of loop-unrolled instructions, where the first set of instructions provides a count of the iteration groups, a count of the loop-unrolled instructions per iteration group, and a count of instruction bytes per iteration group (step 202). As each loop-unrolled instruction of an iteration group is processed, if the loop-unrolled instruction is a prefetching candidate instruction (step 204), a predefined mapping function is applied to a combination of the instruction address of the loop-unrolled instruction, an index number indicating the position of its iteration group within a sequence of the iteration groups, and the instruction byte count (step 206) to identify a corresponding stride-tracking record that is shared by a corresponding loop-unrolled instruction in each of the iteration groups (step 208). Stride information associated with corresponding loop-unrolled instructions in each of the iteration groups is stored in their shared stride-tracking record (step 210). Data are prefetched in accordance with conventional strided prefetching techniques based on any of the stride-tracking records that meets predefined eligibility criteria for prefetching (step 212).

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prefetching data, the method comprising:
   determining that a first set of instructions that is processed by a computer processor indicates that a second set of instructions includes a plurality of iteration groups, wherein each of the iteration groups includes one or more loop-unrolled instructions;
   monitoring the second set of instructions as the second set of instructions is processed by the computer processor after the first set of instructions is processed by the computer processor;
   mapping a corresponding one of the loop-unrolled instructions in each of the iteration groups of the second set of instructions to a stride-tracking record that is shared by the corresponding loop-unrolled instructions; and
   refetching data into a cache memory of the computer processor based on the stride-tracking record,
   wherein the second set of instructions immediately follows the first set of instructions in a parent set of instructions that includes the first set of instructions and the second set of instructions.

2. The method of claim 1 wherein the prefetching is performed if the stride-tracking record meets a predefined criterion.

3. The method of claim 1 wherein the mapping is performed if the corresponding loop-unrolled instructions are prefetching candidate instructions.

4. The method of claim 1 wherein the loop-unrolled instructions are associated with a loop of instructions, and wherein each of the iteration groups corresponds to a different iteration of the loop of instructions.

5. The method of claim 1 wherein the first set of instructions indicates:
   a) a count of the iteration groups;
   b) a count of the loop-unrolled instructions in any of the iteration groups, wherein the count of the loop-unrolled instructions is the same for each of the iterations groups; and
   c) a count of instruction bytes in any of the iteration groups, wherein the count of instruction bytes is the same for each of the iterations groups.

6. The method of claim 1 wherein each of the corresponding loop-unrolled instructions has a different instruction address.

7. The method of claim 1 wherein the iteration groups form a sequence within the second set of instructions, and wherein the mapping comprises applying a mapping function to a combination of:
   a) an instruction address of the corresponding loop-unrolled instruction being mapped;
   b) an index number, within the sequence, of the iteration group of the corresponding loop-unrolled instruction being mapped; and
   c) a count of instruction bytes within the iteration group of the corresponding loop-unrolled instruction being mapped.

8. A system for prefetching data, the system comprising:
   a computer processor; and
   a prefetcher assembled with the computer processor, wherein the prefetcher is configured to:
     determine that a first set of instructions that is processed by the computer processor indicates that a second set of instructions includes a plurality of iteration groups, wherein each of the iteration groups includes one or more loop-unrolled instructions;
     monitor the second set of instructions as the second set of instructions is processed by the computer processor after the first set of instructions is processed by the computer processor;
     map a corresponding one of the loop-unrolled instructions in each of the iteration groups of the second set of instructions to a stride-tracking record that is shared by the corresponding loop-unrolled instructions; and
     prefetch data into a cache memory of the computer processor based on the stride-tracking record,
   wherein the second set of instructions immediately follows the first set of instructions in a parent set of instructions that includes the first set of instructions and the second set of instructions.

9. The system of claim 8 wherein the prefetcher is configured to prefetch the data if the stride-tracking record meets a predefined criterion.

10. The system of claim 8 wherein the loop-unrolled instructions are prefetching candidate instructions.

11. The system of claim 8 wherein the loop-unrolled instructions are associated with a loop of instructions, and wherein each of the iteration groups corresponds to a different iteration of the loop of instructions.

12. The system of claim 8 wherein the first set of instructions indicates:
   a) a count of the iteration groups;
   b) a count of the loop-unrolled instructions in any of the iteration groups, wherein the count of the loop-unrolled instructions is the same for each of the iterations groups; and
   c) a count of instruction bytes in any of the iteration groups, wherein the count of instruction bytes is the same for each of the iterations groups.

13. The system of claim 8 wherein each of the corresponding loop-unrolled instructions has a different instruction address.

14. The system of claim 8 wherein the iteration groups form a sequence within the second set of instructions, and wherein the prefetcher is configured to map by applying a mapping function to a combination of:
   a) an instruction address of the corresponding loop-unrolled instruction being mapped;
   b) an index number, within the sequence, of the iteration group of the corresponding loop-unrolled instruction being mapped; and
   c) a count of instruction bytes within the iteration group of the corresponding loop-unrolled instruction being mapped.

* * * * *